United States Patent
Morrow

(10) Patent No.: US 10,612,710 B2
(45) Date of Patent: *Apr. 7, 2020

(54) METHOD OF JOINING PIPES AND APPARATUS FOR FACILITATING THE SAME

(71) Applicant: Robert J. Morrow, San Clemente, CA (US)

(72) Inventor: Robert J. Morrow, San Clemente, CA (US)

(*) Notice: Subject to any disclaimer, the term of this patent is extended or adjusted under 35 U.S.C. 154(b) by 162 days.

This patent is subject to a terminal disclaimer.

(21) Appl. No.: 15/693,117

(22) Filed: Aug. 31, 2017

(65) Prior Publication Data

US 2017/0363243 A1  Dec. 21, 2017

Related U.S. Application Data

(63) Continuation of application No. 14/645,182, filed on Mar. 11, 2015, now Pat. No. 9,791,085.

(51) Int. Cl.
*B29C 65/20* (2006.01)
*F16L 41/02* (2006.01)
(Continued)

(52) U.S. Cl.
CPC .............. *F16L 47/32* (2013.01); *B23K 1/00* (2013.01); *B29C 65/20* (2013.01);
(Continued)

(58) Field of Classification Search
CPC ..... B29C 65/18; B29C 65/20; B29C 65/7847; B29C 66/0244; B29C 66/1142;
(Continued)

(56) References Cited

U.S. PATENT DOCUMENTS

| 4,490,209 A | 12/1984 | Hartman |
| 4,542,892 A | 9/1985 | Goldner |

(Continued)

FOREIGN PATENT DOCUMENTS

| CH | 400547 | 10/1965 | |
| CH | 400547 A | * 10/1965 | ............. B29C 65/20 |

(Continued)

OTHER PUBLICATIONS

Supplementary European Search Report from European Patent Office on co-pending EP application (EP16762354.5) dated Oct. 24, 2018.

(Continued)

*Primary Examiner* — Michael A Tolin
(74) *Attorney, Agent, or Firm* — Klein, O'Neill & Singh, LLP

(57) ABSTRACT

An apparatus and method for joining pipes includes a plate for melting mating surfaces of the pipes to be joined. Additionally, the apparatus utilizes a vacuum in order to push the first and second pipes together in lieu of hand or mechanical pressure which may be inconsistent. Additionally, the vacuum allows the pipes to be joined to settle on each other in order to create a pressure about a periphery of the end of the pipe being joined to the other pipe. The consistent pressure creates a very strong joint between the first and second pipes.

20 Claims, 10 Drawing Sheets

(51) Int. Cl.
*F16L 47/32* (2006.01)
*B29C 65/78* (2006.01)
*B29C 65/00* (2006.01)
*B29D 23/00* (2006.01)
*F16L 47/02* (2006.01)
*F16L 47/26* (2006.01)
*B23K 1/00* (2006.01)
*B29L 31/24* (2006.01)
*B29K 27/06* (2006.01)
*B29K 23/00* (2006.01)

(52) U.S. Cl.
CPC ...... *B29C 65/7847* (2013.01); *B29C 66/0244* (2013.01); *B29C 66/1142* (2013.01); *B29C 66/131* (2013.01); *B29C 66/301* (2013.01); *B29C 66/342* (2013.01); *B29C 66/348* (2013.01); *B29C 66/3474* (2013.01); *B29C 66/5221* (2013.01); *B29C 66/5224* (2013.01); *B29C 66/71* (2013.01); *B29C 66/73921* (2013.01); *B29C 66/8181* (2013.01); *B29C 66/81422* (2013.01); *B29C 66/81423* (2013.01); *B29C 66/82661* (2013.01); *B29C 66/861* (2013.01); *B29C 66/91411* (2013.01); *B29C 66/91921* (2013.01); *B29D 23/003* (2013.01); *F16L 41/023* (2013.01); *F16L 47/02* (2013.01); *F16L 47/26* (2013.01); *B29C 66/02241* (2013.01); *B29C 66/81431* (2013.01); *B29C 66/82423* (2013.01); *B29C 66/8322* (2013.01); *B29C 2793/0018* (2013.01); *B29C 2793/0081* (2013.01); *B29K 2023/06* (2013.01); *B29K 2023/12* (2013.01); *B29K 2027/06* (2013.01); *B29L 2031/24* (2013.01)

(58) Field of Classification Search
CPC ... B29C 66/131; B29C 66/301; B29C 66/347; B29C 66/3474; B29C 66/348; B29C 66/349; B29C 66/5221; B29C 66/5224; B29C 66/52241; B29C 66/5324; B29C 66/53241; B29C 66/71; B29C 66/73921; B29C 66/81455; B29C 66/82661; B29C 2793/0018; B29D 23/003; B29D 23/008; B29K 2023/06; B29K 2023/12; B29K 2027/06; B29L 2031/24; B29L 2031/246; F16L 41/021; F16L 41/023; F16L 47/02; F16L 47/26; F16L 47/28; F16L 47/32

See application file for complete search history.

(56) References Cited

U.S. PATENT DOCUMENTS

| | | | |
|---|---|---|---|
| 4,927,999 A | 5/1990 | Hanselka | |
| 4,957,570 A | 9/1990 | Jenkins | |
| 5,187,343 A | 2/1993 | Edwards | |
| 6,047,757 A * | 4/2000 | Parish, II | B29C 65/20 156/499 |
| 6,994,766 B2 | 2/2006 | Temple | |
| 7,294,222 B2 | 11/2007 | Temple | |
| 9,791,085 B2 * | 10/2017 | Morrow | F16L 47/32 |
| 2008/0001394 A1 | 1/2008 | Ziu | |
| 2010/0207382 A1 | 8/2010 | Christodoulou et al. | |
| 2014/0076414 A1 | 3/2014 | Kokoski | |

FOREIGN PATENT DOCUMENTS

| | | | | |
|---|---|---|---|---|
| EP | 0341494 A2 * | 11/1989 | | B29C 65/342 |
| JP | 59101326 A * | 6/1984 | | B29C 65/02 |
| JP | 2000179773 | 6/2000 | | |
| JP | 2007155031 | 6/2007 | | |
| NL | 1007746 | 6/1999 | | |
| NL | 1007746 C2 * | 6/1999 | | B29C 66/1142 |

OTHER PUBLICATIONS

Friatec, Friafit® Sewage Saddle Vacuum-Loading ASA-VL for connection of connecting pipes to HD-PE sewage drain of SDR 33-SDR 11, Updated Apr. 2014, pp. 1-2.
Friatec, Friafit® Sewage System the Safe Connection Technique for HDPE Sewer Pipes Assembly Instructions, Jul. 16, 2014, pp. 1-48.
Friatec, Friafit® Sewage System the Safe Connection Method for HD-PE Pipes Carrying Sewage and Waste Water, Feb. 1, 2013, pp. 1-16.
Vigotek Akatherm, PE DRUK-PE PPRESSION Frialen D250-1200, Sep. 16, 2011, pp. 1-12 (Translation not available).
Thomas, Shane, PCT Notification of Transmittal of the International Search Report and the Written Opinion of the International Searching Authority, or the Declaration, Jul. 26, 2016, pp. 1-15.
Polyethylene Joining Procedures, Fusion Support Services, LLC (website), Published Feb. 7, 2015, Retrieved from the Internet on Apr. 28, 2016, URL:<http://web.archive.org/web/20150207201944/http://hdpe-fusionsupport.com/joining.htm>.
PhilmacAustralia, A guide on how to install a Friatec XL Electrofusion Vacuum Saddle (video), Published Jul. 25, 2013, URL:<https://www.youtube.com/watch?v=60gnEnQXX7o>.

* cited by examiner

METHOD OF JOINING PIPES AND APPARATUS FOR FACILITATING THE SAME

CROSS-REFERENCE TO RELATED APPLICATIONS

This application is a continuation application of U.S. patent application Ser. No. 14/645,182, filed on Mar. 11, 2015, now U.S. Pat. No. 9,791,085, the entire content of which is expressly incorporated herein by reference.

STATEMENT RE: FEDERALLY SPONSORED RESEARCH/DEVELOPMENT

Not Applicable

BACKGROUND

The various aspects and embodiments described herein relate to an apparatus and method for joining first and second pipes.

Plastic piping is installed underground and/or above ground to transport liquid, air, gas, waste, etc. to or from home or business. These pipes have a need for many connection branches which may need to be installed in a variation of sizes and angles. Whether the branch is tapping onto an existing line or a newly installed pipe, there is a common need to be able to install these connections within a confined space (excavation, vault, etc). In addition there is a need for a process to be able to install branch connections at variable angles to influence the performance of the piping system or to limit the complexity of the connection.

Accordingly, there is a need in the art for a method and apparatus to facilitate joining first and second pipes.

BRIEF SUMMARY

A method for joining pipes and an apparatus for facilitating the same are disclosed herein. The apparatus may include a plate for melting mating surfaces of first and second pipes, or in other words, raising its temperature above its softening temperature. The apparatus may also include a cap with a vacuum for generating a negative pressure within the first and/or second pipes to push the first and second pipes together and also to hold the first and second pipes against the plate. The mating surfaces on the first and second pipes are initially melted. Once the mating surfaces have reached its softening temperature, the plate is removed from between the first and second pipes. The mating surfaces are connected to each other (i.e., placed in contact with each other). The cap is placed over one of the first and second pipes and the vacuum activated in order to create a negative pressure within the pipe. The negative pressure pushes the first and second pipes towards each other. The operator allows the first and second pipes to settle upon each other. This means that the angle between the first and second pipes may be slightly different from the intended angle in order that the pressure between the first and second pipes can be equalized about a periphery of the distal end of the first pipe. This creates an especially strong joint.

Additionally, by using a vacuum to create the negative pressure and force the first and second pipes together, the user need not apply hand pressure which could be inconsistent as well as awkward when the first and second pipes are skewed to each other or when the first and second pipes are joined to each other end to end at a skewed angle.

More particularly, in an aspect, a method of forming a liquid tight seal between a distal end of a first pipe and a second pipe is disclosed. The method may comprise the steps of heating the distal end of the first pipe and the second pipe with a heater until the distal end(s) of the first pipe and the second pipe have reached a softening temperature; contacting the distal end of the first pipe to the second pipe; creating a negative pressure within a cavity of the first pipe after the contacting step so that the distal end of the first pipe is pushed into the second pipe; and applying even pressure about the circumference of the distal end of the first pipe onto the second pipe.

The heating step may be performed until at least ⅛ inch and more preferably ½ inch (depending on the size and type of material) of the distal end of the first pipe has reached the softening temperature of a material of the pipe.

The heating step may be performed with a plate having opposed first and second sides sized and configured to mate with the distal end of the first pipe and the exterior surface or distal end of the second pipe. The first side may have a convex configuration. The second side may have a concave configuration. Alternatively, the first and second sides may be flat.

The method may further comprise the step of forming a vacuum with an edge of a cup to the exterior surface of the second pipe.

The forming the vacuum step may include the step of capping an opposed distal end of the first pipe with a cap which is in fluid communication with a vacuum device for creating negative pressure.

The applying step may include the step of allowing an angular relationship between the first pipe and the second pipe to change as negative pressure is applied to the cavity of the first pipe, and the distal end of the first pipe is pushed into the second pipe.

The method may further comprise the step of creating the negative pressure within the cavity of the first pipe during the heating step so that the negative pressure created in the cavity of the first pipe is sufficient to hold the first side of the plate of the heater onto the distal end of the first pipe.

The plate of the heater may have a through hole so that the negative pressure created in the cavity of the first pipe is applied between the plate and the second pipe to hold the plate onto the second pipe. The through hole may also have a fitting that can be connected to a hose or line that provides negative pressure to the space between the plate and the second pipe to hold the plate onto the second pipe initially while raising the temperature of the second pipe to its softening temperature. This may be accomplished without the first pipe attached to the heater/plate. After a certain depth of material of the second pipe has been raised to an elevated temperature below its softening temperature, the vacuum line is removed from the fitting and the first pipe is placed on the heater/plate. Vacuum is established in the cavity of the first pipe and the vacuum is communicated to the space between the plate and the second pipe through the through hole or fitting so that the heater can continue to raise a depth of the surfaces of the first and second pipes to its softening temperature.

In the method, the distal end of the first pipe may be attached to an exterior surface of the second pipe. The distal end of the first pipe may be attached to a distal end of the second pipe. Also, the vacuum may be created by capping an opposed distal end of the second pipe.

In another aspect, a pipe attaching machine for forming a liquid tight seal between a distal end of a first pipe and a second pipe is disclosed. The pipe attaching machine may comprise a heater, a cap and a vacuum. The heater may have a plate and a handle. The plate may have opposed first and second sides sized and configured to mate with the distal end of the first pipe and the second pipe. The plate may be operative to provide heat to the distal end of the first pipe and the second pipe for raising its temperature to a softening temperature of the first and second pipes. The handle may be attached to the plate. The handle may be insulated from the plate so that the handle can be gripped by a person to manipulate the heater plate even when the plate is heated. The cap may be sized and configured to provide a seal with an opposed distal end of the first pipe. The vacuum may be operative to create a negative pressure. The vacuum may be in fluid communication with the cap to create negative pressure within a cavity of the first pipe when the cap is mounted to the opposed distal end of the first pipe to hold the first pipe to the heater when heating (i.e., melting) the distal end of the first pipe and also to hold the distal end against the exterior surface of the second pipe when attaching the distal end of the first pipe to the second pipe.

The plate may have a through hole so that negative pressure created in the cavity of the first pipe may be applied between the plate and the second pipe to hold the plate to the second pipe.

The first side of the plate may have a convex configuration sized and be configured to mate with the distal end of the first pipe. The second side of the plate may have a concave configuration sized and configured to mate with an exterior surface of the second pipe.

The plate may also have a cup disposed in the second side. An edge of the cup may be sized and configured to contact the exterior surface of the second pipe before the concave configured second side of the plate to more quickly form a seal to create a negative pressure between the second side of the plate and the exterior surface of the second pipe. Alternatively, in lieu of the cup disposed on the second side of the plate, the seal may be established by contact with a gasket or softening plastic cup or ring.

In an alternate embodiment, the first side of the plate may be flat and be sized and configured to mate with the distal end of the first pipe. Also, the second side of the plate may be flat and be sized and configured to mate with a distal end of the second pipe.

In another aspect, a method for expediting fusion of a distal end of a first pipe to a contact surface of a second pipe is disclosed. The method may comprise the steps of cooling a distal end portion of the first pipe and/or a contact patch portion of the second pipe below its normal temperature; heating the distal end of the first pipe and/or the contact surface of the second pipe so that a portion less than the distal end portion and/or less than the contact patch portion of the second pipe is heated to a softening temperature of a material of the first pipe and/or second pipe; pushing the distal end of the first pipe onto the contact surface of the second pipe; and directing heat away from the distal end of the first pipe and/or the contact patch of the second pipe since less than the distal end portion of the first pipe and/or less than the contact patch portion of the second pipe was heated and the entire distal end portion of the first pipe and the entire contact patch portion was cooled below its normal temperature.

The contact patch may be a distal end of the second pipe. The contact patch may be an exterior surface of the second pipe.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
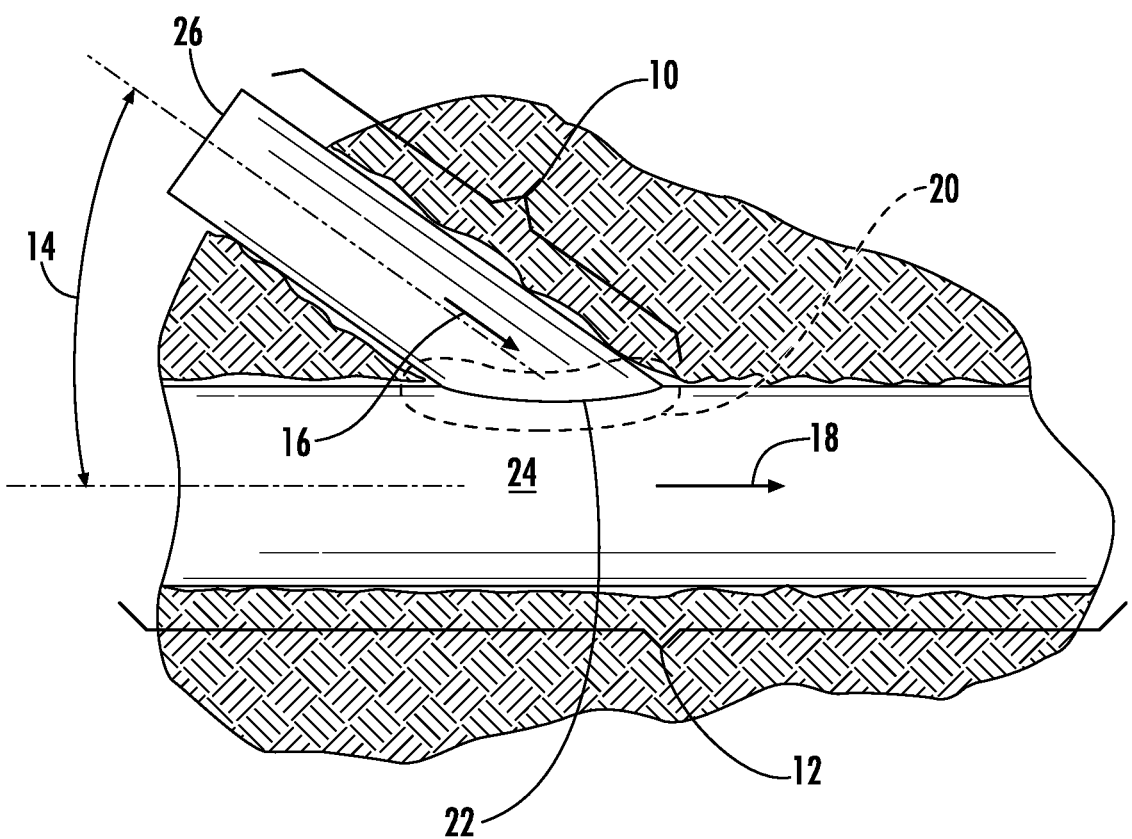
FIG. 1 is a top view of a ditch showing joined first and second pipes.

Referring now to the drawings, a method and apparatus is disclosed for joining a branch pipe 10 to a main pipe 12 at a skewed angle 14 so that gas, fluid and other solid materials can flow through the branch pipe 10 in the direction of arrow 16 to flow with gas, fluid and other solid material through the main pipe 12 in the direction of arrow 18.

A connection between a distal end 22 of the branch pipe 10 and an exterior surface 24 of the main pipe 12 is referred to as a joint 20. The distal end 22 of the branch pipe 10 and the mating portion of the exterior surface 24 of the main pipe 12 are heated to a softening temperature then pushed together to form a chemical bond and join the branch pipe 10 to the main pipe 12. The periphery of the distal end 22 when pushed into the exterior surface 24 applies a consistent pressure to the exterior surface 24 of the main pipe 12 to create a strong connection between the distal end 22 of the branch pipe 10 and the mating portion of the exterior surface 24 of the main pipe 12. To push the distal end 22 of the branch pipe 10 into the exterior surface 24 of the main pipe 12 with such consistent pressure, an opposed distal end 26 of the branch pipe 10 is fitted with a cap 28 that has a vacuum 29 operative to create a vacuum 108 within the branch pipe 10. Once the vacuum 29 is turned on, negative pressure is created within the cavity 36 of the branch pipe 10. The negative pressure pushes the distal end 22 of the branch pipe 10 into the exterior surface 24 of the main pipe 12. The branch pipe 10 is allowed to settle on the main pipe 12 so that the angle 14 may be different as intended if necessary. The settling insures that the pressure about the periphery of the distal end 22 on the exterior surface 24 of the main pipe 12 is consistent about the entire periphery of the distal end 22.

Figure 2:
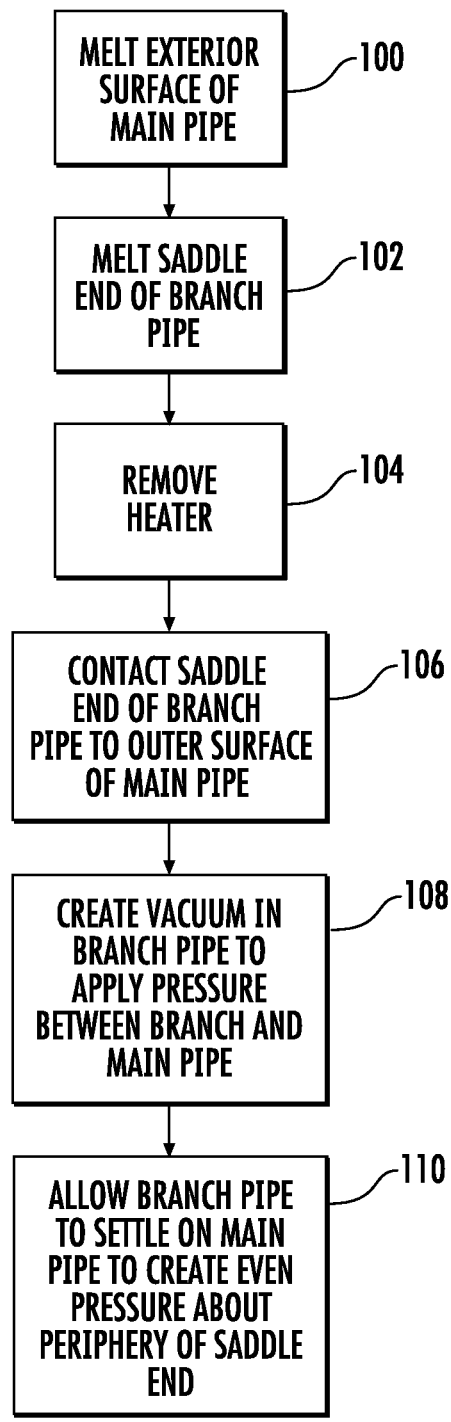
FIG. 2 is a flowchart of a method for joining first and second pipes.

Referring now to FIG. 2, a method of attaching the branch pipe 10 to the main pipe 12 is shown. The steps of the method shown in FIG. 2 will be explained in conjunction with FIGS. 3-6. To attach the branch pipe 10 to the main pipe 12, the distal end 22 of the branch pipe 10 may be preformed or ground down to mate with the mating portion of the exterior surface 24 of the main pipe 12 are heated to their softening temperatures. These softening temperatures of the pipes 10, 12 vary depending on the material from which the pipes 10, 12 are fabricated. By way of example and not limitation, common pipes 10, 12 are fabricated from high density polyethylene (HDPE), low density polyethylene (LDPE), polyvinyl chloride (PVC), or polypropylene. For purposes of illustration herein, pipes 10, 12 are fabricated from HDPE material. In this regard, the softening temperature for pipes 10, 12 which are fabricated from HDPE material is about 440 degrees Fahrenheit to 500 degrees Fahrenheit.

As discussed above, the distal end 22 of the branch pipe 10 may be preformed or ground down to mate with the exterior surface of the main pipe 12. If the distal end 22 of the branch pipe 10 is preformed, then the distal end 22 of the branch pipe 10 may be formed with a lip that protrudes outward. The lip may protrude outward a small distance so that the pressure between the lip and the exterior surface of the main pipe is equal about the periphery of the distal end of the branch pipe. When the distal end 22 of the branch pipe 10 is ground down to the shape of the exterior surface of the main pipe, then it is only the thickness of the branch pipe 10 that is fused to the exterior surface of the main pipe. Moreover, when the distal end 22 of the branch pipe 10 is ground down, then no special pipes are needed to make the connection. Standard straight pipes are used and modified on site.

In heating the distal end 22 of the branch pipe 10 and the exterior surface 24 of the main pipe 12, the exterior surface 24 of the main pipe 12 is melted 100. Moreover, the distal end 22 otherwise known as the saddle end of the branch pipe 10 is melted 102. The distal end 22 of the branch pipe 10 and the exterior surface 24 of the main pipe 12 are melted with a plate 30. The plate 30 has a first side 32 having a convex configuration. The plate 30 also has a second side 34 having a concave configuration. The concavity of the second side 34 of the plate 30 approximates a curvature of the pipe 12 so that upon contact of the second side 34 of the plate 30, the heat emanating from the second side 34 of the plate 30 can melt 100 the exterior surface 24 of the main pipe 12. Similarly, the convex configuration of the first side 32 mirrors the concavity of the second side 34 so that the first side 32 can melt 102 the distal end 22 of the branch pipe 10. Prior to melting, the end portion of the branch pipe 10 may be cut or formed so that the shape of the distal end 22 closely approximates the shape of the exterior surface 24 of the main pipe 12 to which the branch pipe 10 connects.

To hold the plate 30 against the exterior surface 24 of the main pipe 12 and the distal end 22 of the branch pipe 10, a negative pressure 108 can be created within the internal cavity of the branch pipe 10 with vacuum 29. Additionally, such negative pressure may also be communicated to cavity 36 (see FIG. 8) through hole 44 of the plate. It is also contemplated that the through hole may be fitted with a fitting sized and configured to receive a vacuum line. Initially, the vacuum line may be connected to the fitting of the plate. The vacuum line provides negative pressure between the plate and the main pipe to hold the heater on the main pipe while raising the temperature of the main pipe toward its softening temperature. This is accomplished without the branch pipe attached to the heater. After a period of time before the main pipe reaches the softening temperature, the vacuum line is removed and the branch pipe is attached to the heater/plate 30. A vacuum created in a cavity of the branch pipe is communicated between the plate and the main pipe through the fitting on the plate. The negative pressure within the internal cavity of the branch pipe 10 and the cavity 36 between the plate 30 and the main pipe 12 continues to push the second side 34 of the plate 30 against exterior surface 24 of the main pipe 12 as well as pushes the distal end 22 of the branch pipe 10 against the first side 32 of the plate 30. The heat from the plate 30 is communicated to the exterior surface 24 of the main pipe 12 and the distal end 22 of the branch pipe 10. About ⅛ of an inch of the distal end 22 of the branch pipe 10 is raised to a softening temperature of the pipe 10. Additionally, a depth of about ⅛ of an inch of the exterior surface 24 of the main pipe 12 is raised to the softening temperature of the pipe 12. In this manner, when the distal end 22 of the branch pipe 10 and the exterior surface 24 of the main pipe 12 are directly attached to each other, the respective materials can form a chemical bond therebetween.

When the exterior surface 24 of the main pipe 12 and the distal end 22 of the branch pipe 10 is sufficiently heated as described above, the negative pressure within the internal cavity of the branch pipe 10 and the cavity 36 is removed so that the plate 30 can be removed 104 (see FIGS. 2 and 4) from between the branch pipe 10 and the main pipe 12. Immediately thereafter, the distal end 22 of the branch pipe 10 is placed in contact 106 (see FIGS. 2 and 5) with the exterior surface of the main pipe. The vacuum 29 is turned on again in order to create 108 negative pressure within the internal cavity of the branch pipe 10. As you will note from FIG. 4, no through hole is formed in the exterior surface 24 of the main pipe 12 so that the negative pressure in the internal cavity of the branch pipe 10 pushes the distal end 22 of the branch pipe 10 into the exterior surface 24 of the main pipe 12. The periphery of the distal end 22 of the branch pipe 10 may not match perfectly with the exterior surface 24 of the main pipe 12. In this regard, as the negative pressure pushes the branch pipe 10 into the main pipe 12, such mismatch may cause the branch pipe 10 to shift 110 from its original intended angle. By way of example and not limitation, the original intended skew angle 14 may be 45 degrees. However, due to the mismatch between the concavity formed on the distal end 22 of the branch pipe 10 and the degree of the convex configuration of the exterior surface 24 of the main pipe 12, the skew angle 14 may be 45 degrees±5 degrees and more preferably ±2 degrees after connection of the branch pipe 10 to the main pipe 12. Such shifting equalizes the pressure about the entire periphery of the distal end 22 so that the melted connection between the distal end 22 and the exterior surface 24 of the main pipe 12 has a consistent strength about the entire periphery of the distal end 22 of the branch pipe 10. As can be seen from FIG. 6, the distal end 22 of the branch pipe 10 and the exterior surface 24 of the main pipe 12 form a bead completely about the distal end 22 of the branch pipe 10. The connection is a liquid and airtight seal produced with even pressure about the entire periphery of the distal end 22 against the exterior surface 24 of the main pipe 12.

Figure 3:
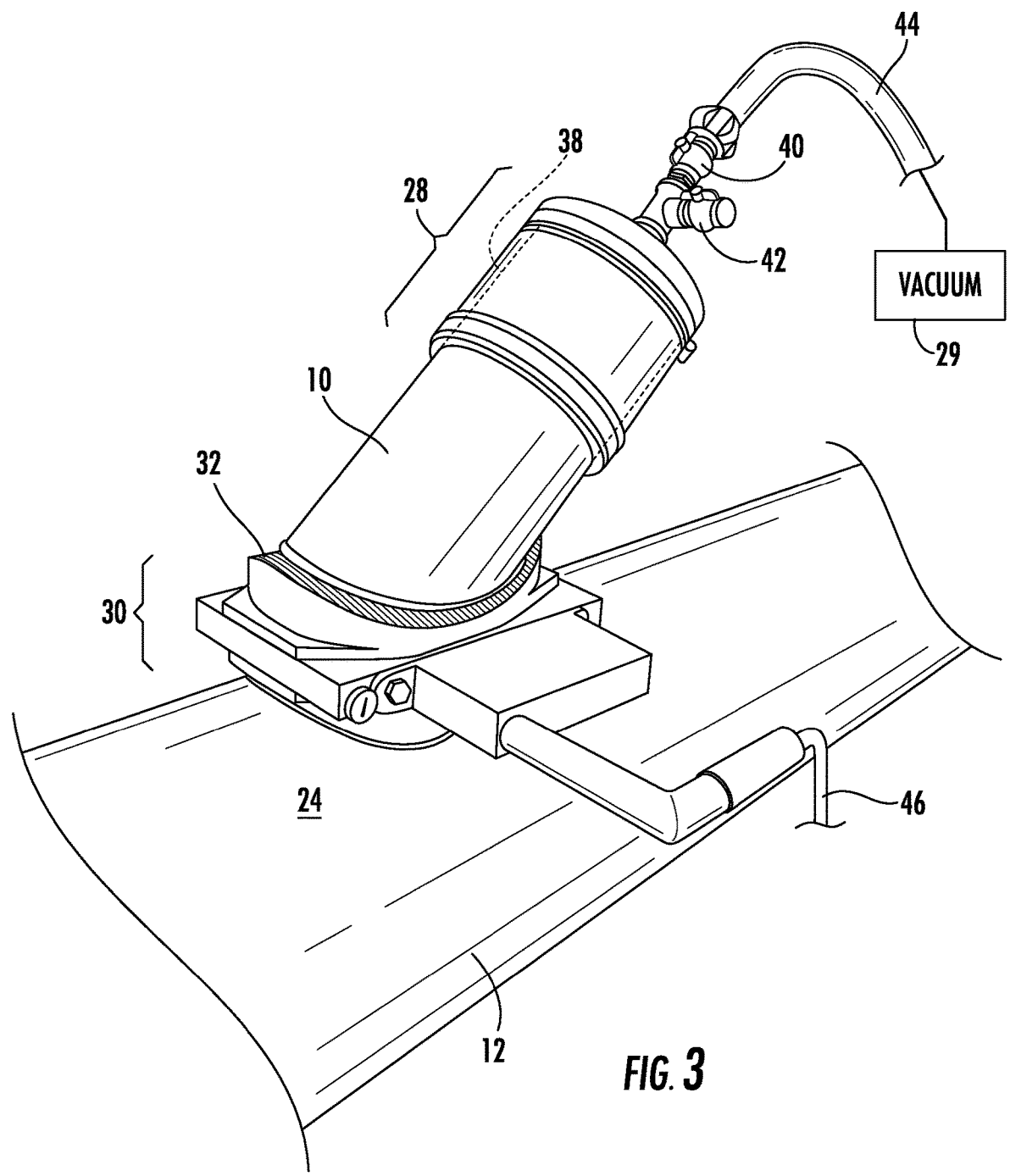
FIG. 3 is a perspective view of an apparatus used to melt mating surfaces of first and second pipes for joining.

Referring now to FIG. 3, the cap 28, as discussed above, may be in fluid communication with vacuum 29 so that the vacuum 29 can create a negative pressure within the internal cavity of the branch pipe 10. The cap 28 is shown as being disposed over an opposed distal end portion 38 to form an airtight seal therewith. The cap 28 may have a butterfly valve 40 and a bleed valve 42. The butterfly valve 40 has an on position and an off position. In the off position, when the vacuum 29 is activated, no negative pressure is created within the internal cavity of the branch pipe 10. Also, there is no fluid communication between the vacuum 29 and the internal cavity of the branch pipe 10. In the on position, as shown in FIG. 3, the vacuum 29, when the vacuum 29 is activated, negative pressure is created within the internal cavity of the branch pipe 10. Fluid communication is established between the vacuum 29 and the internal cavity of the branch pipe 10. The butterfly valve 40 is traversed to the on position after holding the branch pipe 10 against the plate 30 and the plate 30 against the main pipe 12 in order to melt 102 the distal end 22 of the branch pipe 10 and the exterior surface 24 of the main pipe 12. The butterfly valve 40 may be traversed to the off position to allow the heat to soak through the material. The butterfly valve 40 is also traversed to the on position when the plate 30 is removed from between the branch pipe 10, and the main pipe 12 and the distal end 22 of the branch pipe 10 is placed in contact with and pushed against exterior surface 24 of the main pipe 12.

The bleed valve 42 remains closed when the vacuum 29 is activated and the butterfly valve 40 is traversed to the on position. The bleed valve 42 is opened in order to equalize the pressure in the internal cavity of the branch pipe 10 and the atmosphere. In this manner, the plate 30 can be removed from between the branch pipe 10 and the main pipe 12. More particularly, after the plate 30 has sufficiently melted 102 the distal end 22 of the branch pipe 10 and the exterior surface 24 of the main pipe 12, the vacuum 29 may be deactivated and/or the butterfly valve 40 may be traversed to the closed position. The bleed valve 42 may be opened so that air is introduced into the internal cavity of the branch pipe 10 to equalize the pressure within the internal cavity of the branch pipe 10 to the atmosphere. Additionally, the pressure within the cavity 36 between the plate 30 and the main pipe 12 is also equalized to the atmospheric pressure. Now the branch pipe 10 may be removed from the plate 30 and the plate 30 may be removed from the main pipe 12. The bleed valve 42 may be placed downstream of the butterfly valve 40 and be disposed between the cap 28 and the butterfly valve 40.

The vacuum 29 and the cap 28 may be in fluid communication with each other by flex line 44. The flex line 44 does not collapse in the presence of negative pressure. The cap 28 is shown as being attached over the opposed distal end portion 38 of the branch pipe 10. However, other configurations of the cap 28 are also possible. By way of example and not limitation, the cap 28 may be a flange that mates with the opposed distal end of the opposed distal end portion 38 of the branch pipe 10 and a protrusion that is sized and configured to an inner periphery of the branch pipe 10. The cap 28 regardless of whether the cap 28 is placed over the opposed distal end portion 38 of the branch pipe 10 or placed within may be fabricated from a generally flexible material and be somewhat conformable so that the cap 28 may conform to the opposed distal end portion 38 of the branch pipe 10 to form a fluid tight seal between the cap 28 and the branch pipe 10.

Figure 4:
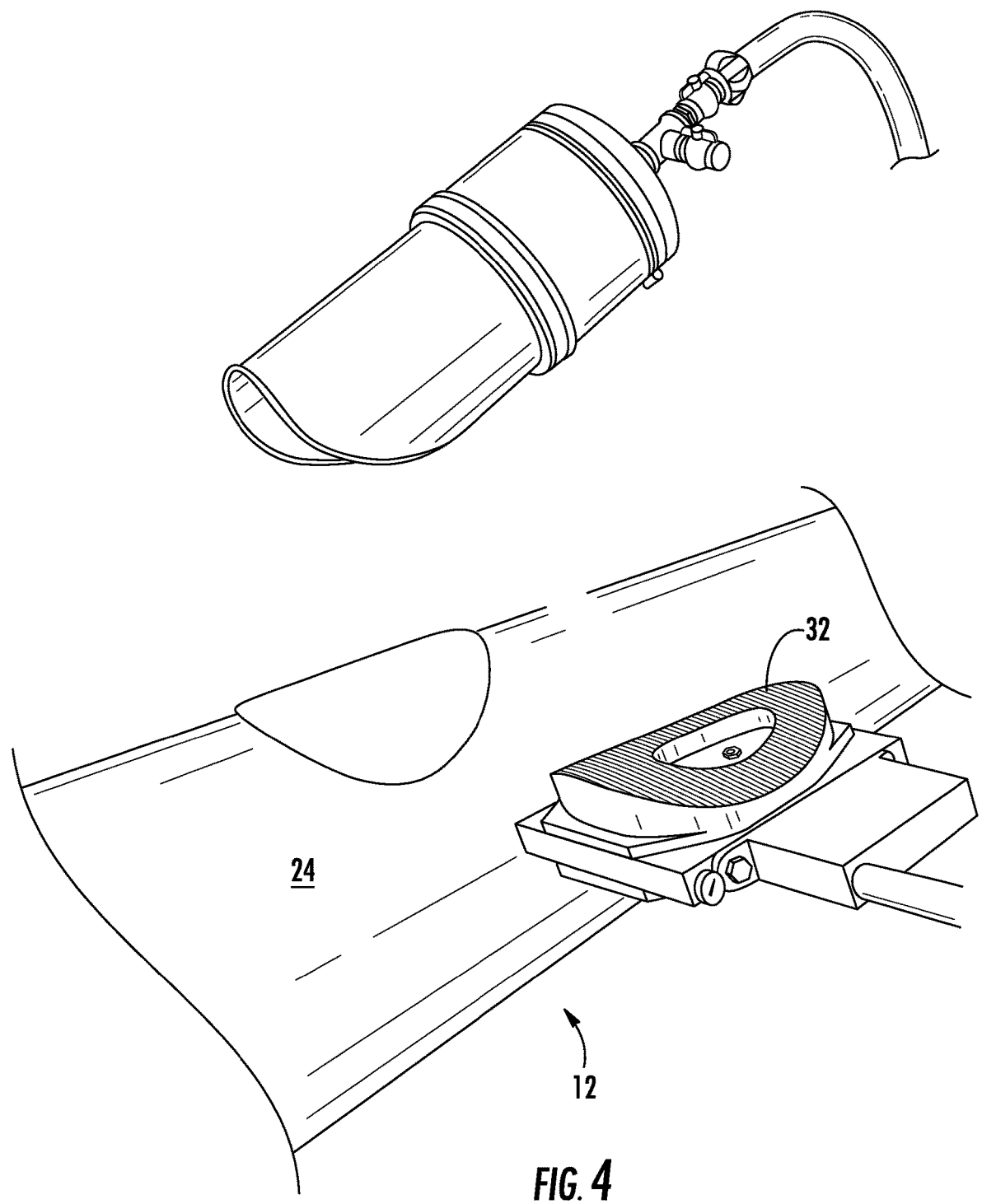
FIG. 4 is a perspective view of the apparatus being removed from between the first and second pipes.
Figure 5:
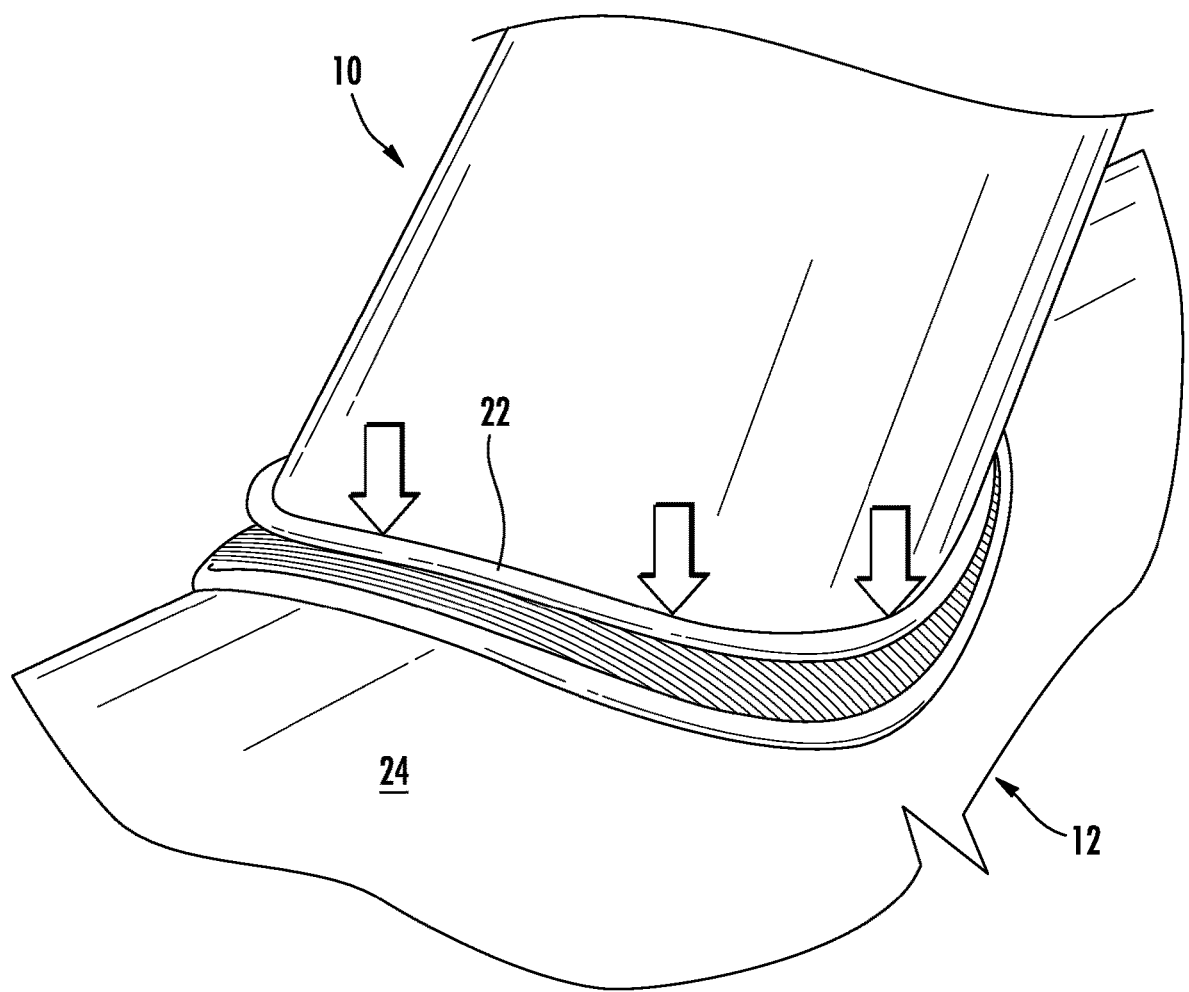
FIG. 5 is an enlarged view of a joint between the first and second pipes.
Figure 6:
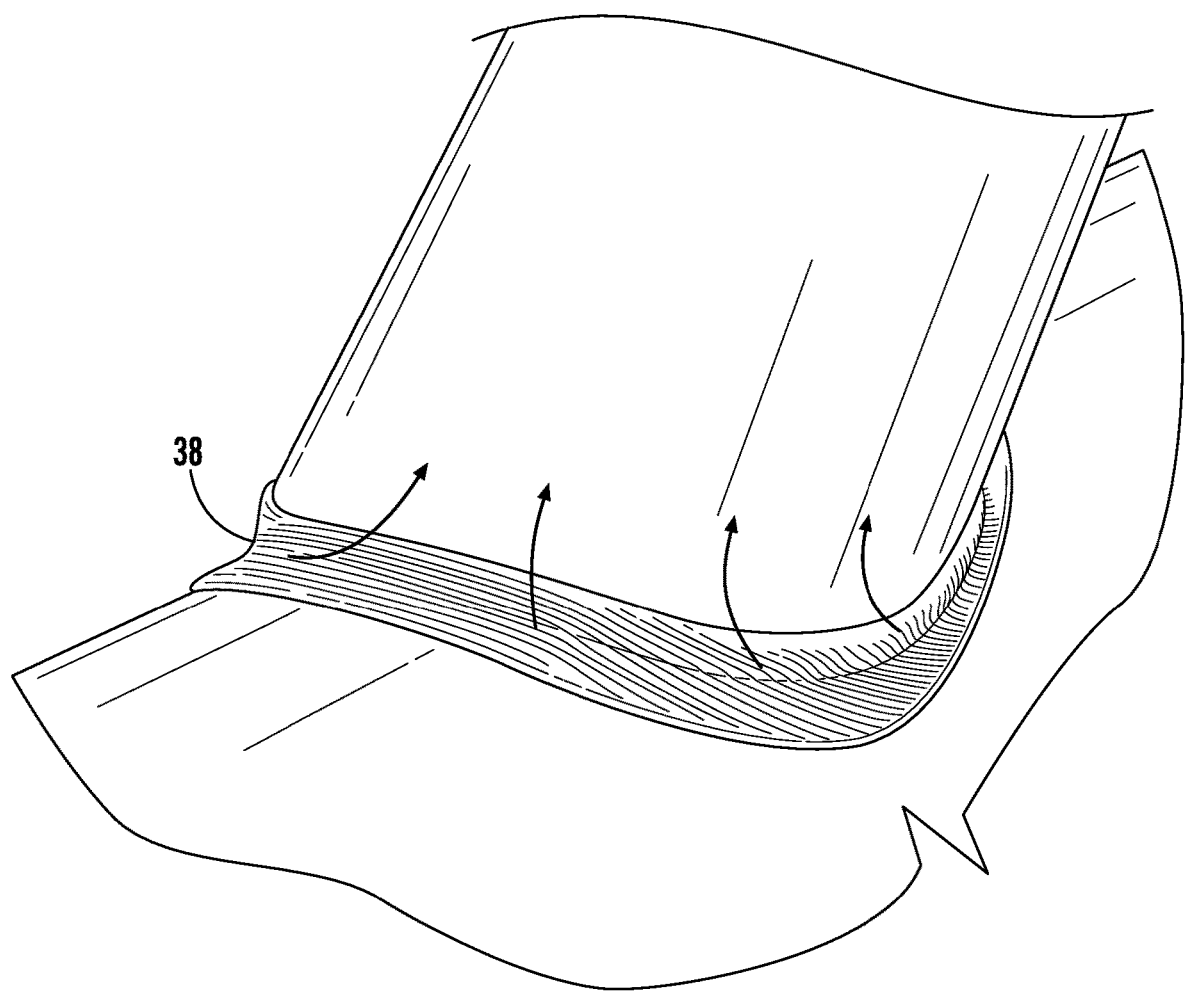
FIG. 6 illustrates the mating surfaces of the first and second pipes forming a bead about a periphery of the joint.
Figure 7:
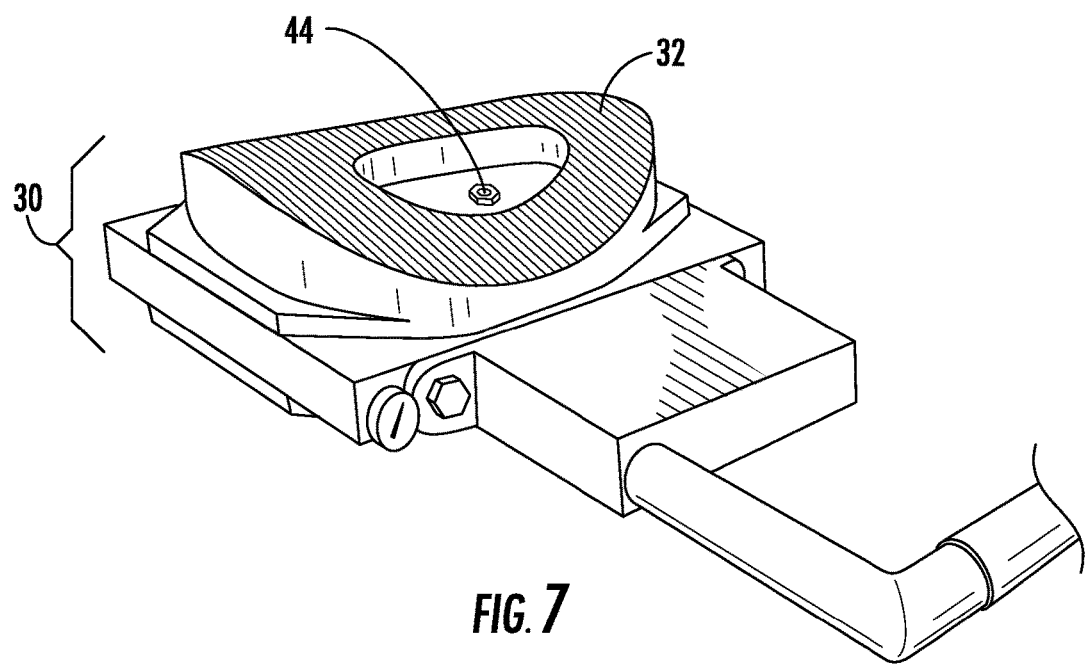
FIG. 7 is a perspective view of a first side of a plate for melting the surfaces of the first and second pipes.
Figure 8:
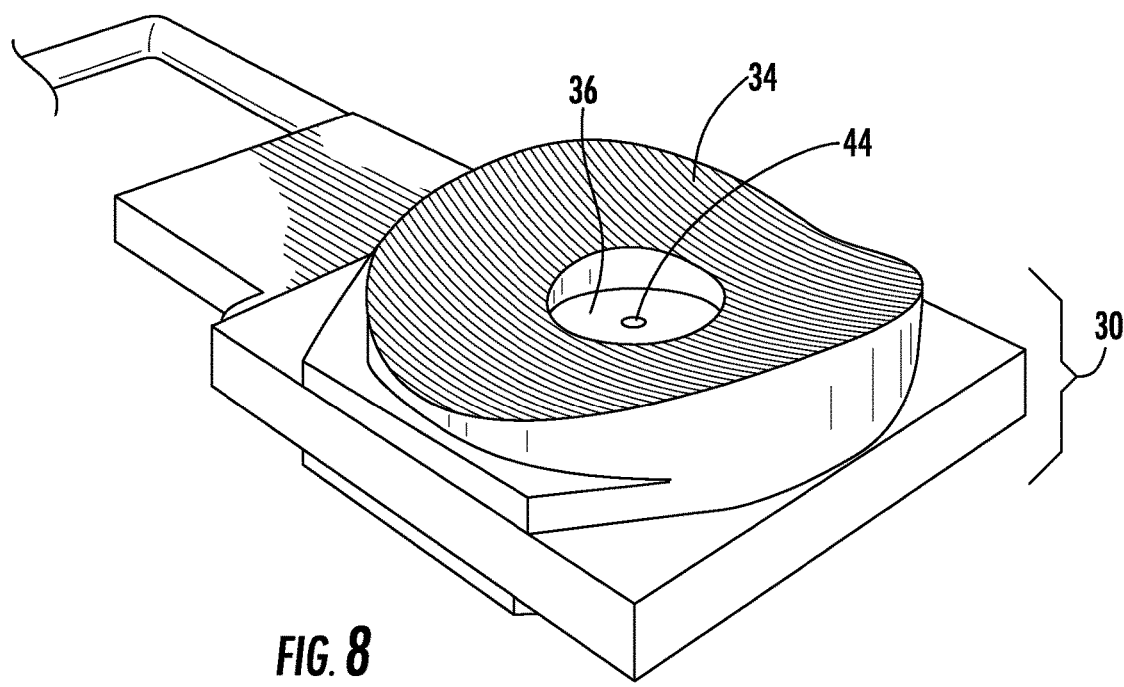
FIG. 8 is a perspective view of a second side of the plate shown in FIG. 7.

Referring now the FIGS. 4, 7 and 8, the plate 30 defines the first side 32 and the second side 34. The first and second sides 32, 34 of the plate 30 preferably match the configuration of the exterior surface 24 of the main pipe 12. Although the apparatus and method described herein relates to the joining of a distal end 22 of the branch pipe 10 to a round or circular main pipe 12, the apparatus and method described herein may be used to join a branch pipe 10 to a main pipe 12 having other configurations such as oval, rectangular, square, etc. The apparatus and method described herein is beneficial in joining the branch pipe 10 to the main pipe 12 at a skewed angle 14 since it is difficult to push the branch pipe 10 into the main pipe 12 by hand when the angle is skewed. The vacuum 29 creates negative pressure to hold the branch pipe 10, plate 30 and the main pipe 12 together during melting as well as the branch pipe 10 and the main pipe 12 together during joining. It is also contemplated that the branch pipe 10 may also be attached to the main pipe 12 at a right angle.

Figure 9:
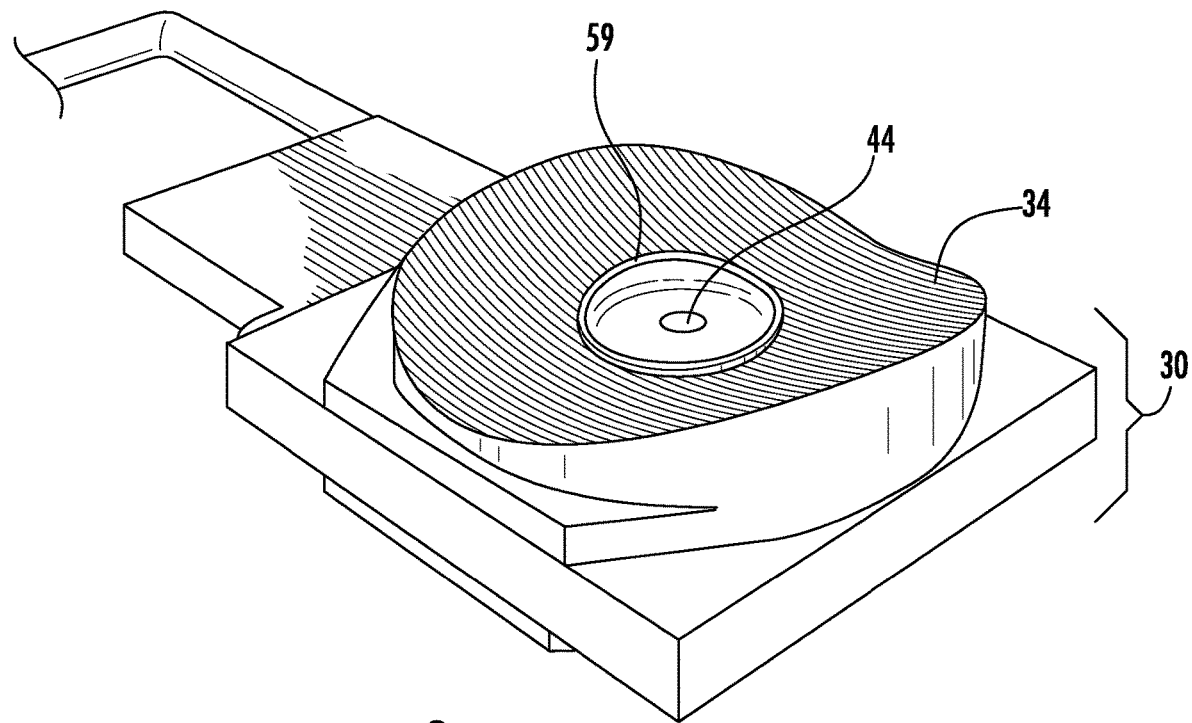
FIG. 9 is an alternate embodiment of the plate for facilitating a quicker way to establish a vacuum.
Figure 9A:
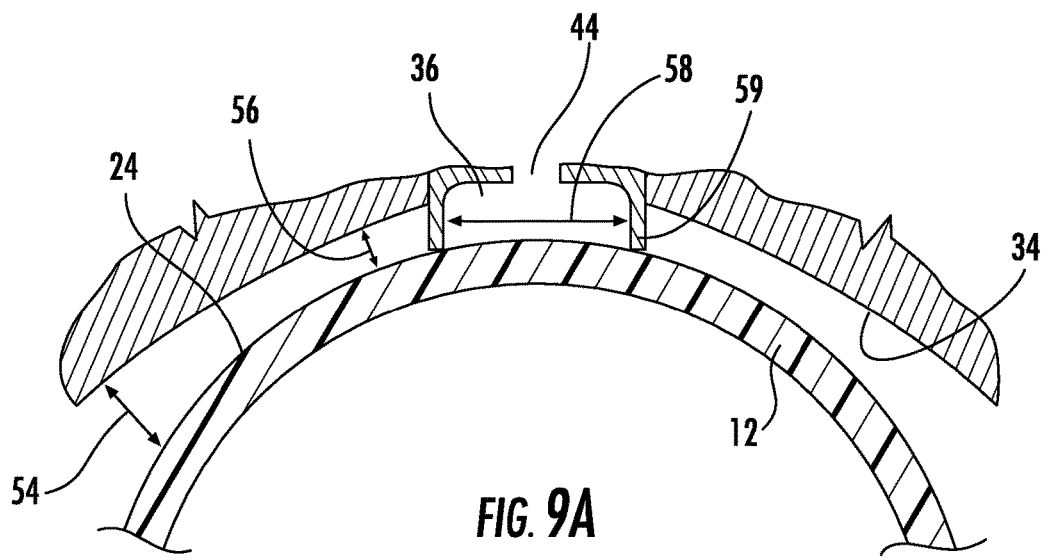
FIG. 9A is a cross sectional view of the alternate embodiment.

As discussed above, the second surface 34 of the plate 30 is concave. The concavity of the second surface 34 is supposed to match the roundness of the second pipe 12. Unfortunately, the pipe 12 may sometimes not be truly round thereby causing an imperfect match between the second side 34 of the plate 30 and the exterior surface 24 of the second pipe 12. As shown in FIG. 9A, in this example, the outer boundaries have a greater gap 54 compared to the inner boundaries as referenced by gap 56, or vice versa. Due to the variance, it may take a significantly longer period of time in order to establish a seal between the second side 34 of the plate 30 and the exterior surface 24 of the second pipe 12. Accordingly, the second side 34 may be retrofitted with a cup 59 having a small diameter 58. The small diameter cup 59 due to its smaller diameter or size more quickly forms the seal with the exterior surface 24 of the second pipe 12. The cup 59 may be heated and capable of penetrating the exterior surface 24 of the second pipe 12 faster. As such, the user may initially push the cup 59 into the exterior surface 24 of the second pipe 12 for a short period of time before a seal between the cup 59 and exterior surface 24 is formed. Once the seal is formed, negative pressure is communicated through the through hole 44 into the cavity 36 to continue pushing the second side 34 of the plate 30 toward the exterior surface 24 of the second pipe 12. The through hole 44 may be fitted with a fitting that can receive a vacuum line. Also, the seal with the main pipe can be established through other means other than a cup in the plate. For example, a gasket may be disposed between the plate and the exterior surface of the main pipe or a cup may be formed in the exterior surface of the main pipe.

Figure 10:
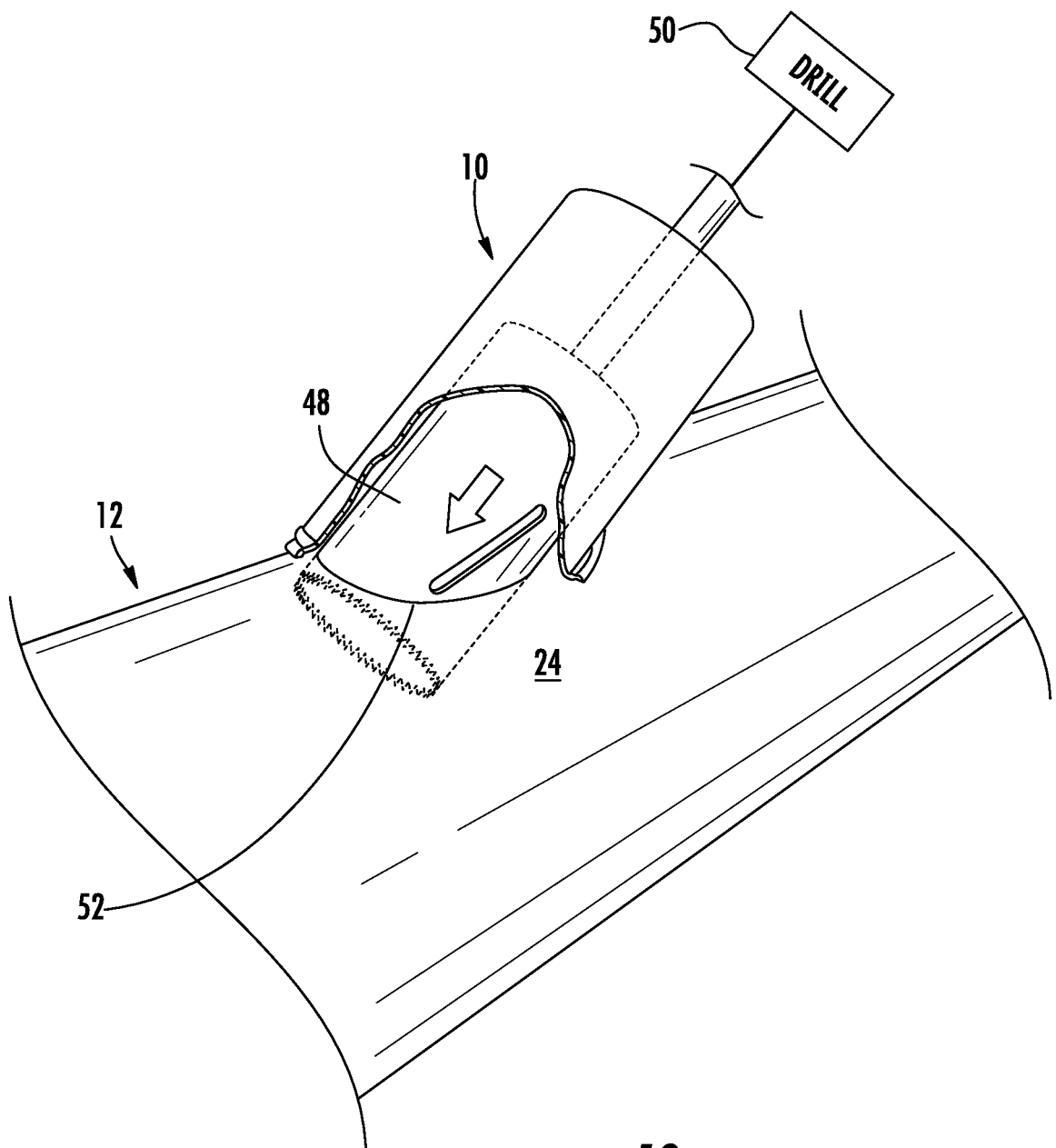
FIG. 10 illustrates a core bit drilling a hole through a surface of a pipe to establish fluid communication between the first and second pipes.

Referring now to FIG. 10, after the distal end 22 of the first pipe 10 is attached to the exterior surface 24 of the second pipe 12, a drillbit 48 may be inserted into the cavity of the first pipe 10. The drillbit 48 is rotated with the drill 50 and used to generate a hole through the exterior surface 24 of the second pipe 12. The hole 52 provides fluid communication between the first and second pipes 10, 12. Moreover, the outer diameter of the drillbit 48 closely approximates the inner diameter of the first pipe 10. After the hole 52 is formed by the drillbit 48, the interior surfaces of the joint between the first and second pipes 10, 12 are filed or sanded down so that no sharp edges exist therebetween pipes 10, 12 so that the fluid and solid materials flowing through the first pipe 10 into the second pipe 12 are not hindered.

Figure 11:
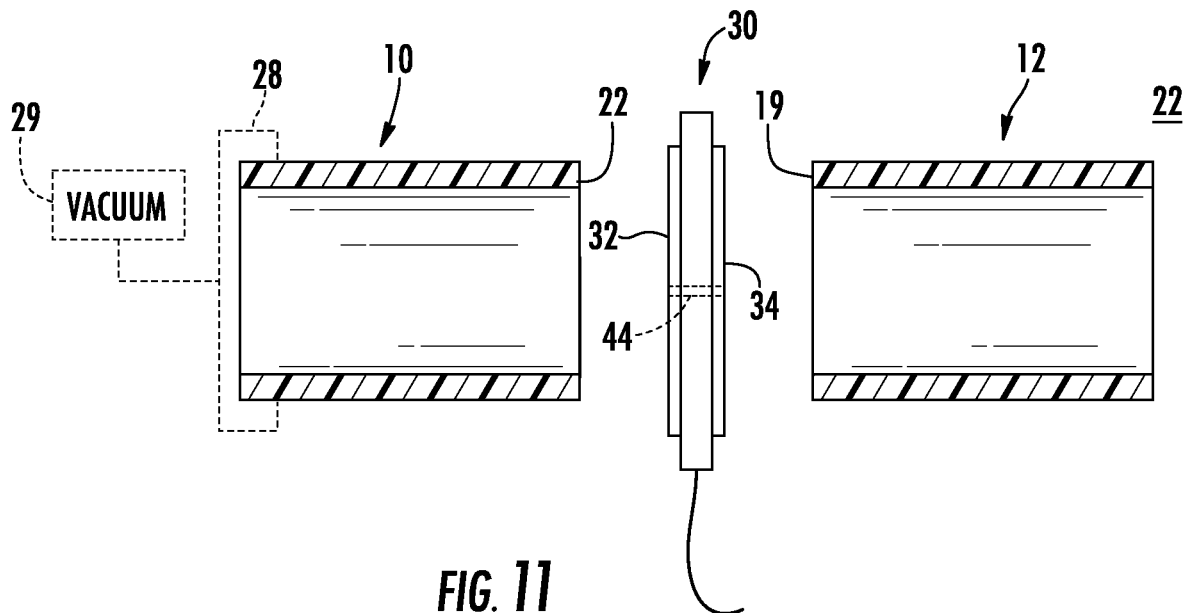
FIG. 11 illustrates the apparatus for joining first and second pipes end to end.

Furthermore, as shown in FIG. 11, it is also contemplated that the apparatus and method may be used to join a distal end 22 of a first pipe 10 to a distal end 19 of a second pipe. In this regard, the first and second sides 32, 34 of the plate 30 may be flat. The opposed distal end 22 of the second pipe may be sealed off to provide for a liquid tight environment within the cavity of the second pipe 12. When the plate 30 is disposed between the distal ends 19, 22 of the first and second pipes 10, 12 and the cap 28 is placed on the opposed distal end portion of the first pipe 10 with the vacuum 29 activated, negative pressure is created within the cavity of the first pipe 10 and such negative pressure is also communicated to the cavity of the second pipe 12 to push the first and second pipes together on the plate 30.

The plate 30 has a through hole 44 which communicates the negative pressure from one side of the plate 30 to the other side of the plate 30. In particular, the negative pressure created within the cavity of the branch pipe 10 is communicated to the cavity 36 (see FIG. 8) on the second side of the plate 30. Additionally, the negative pressure created within the first pipe is created within the internal cavity of the second pipe via the through hole 44.

The first and second sides 32, 34 may have a texture formed thereon. As such, when the first and second sides 32, 34 of the plate 30 are placed on the distal end 22 of the branch pipe and the exterior surface 24 of the main pipe 12, no negative pressure is created within the internal cavity of the branch pipe 10 or the cavity 36 between the plate 30 and the main pipe 12. The textured form allows for the transfer of air that prevents the formation of a liquid tight seal. Instead, the user may need to initially push the branch pipe 10 against the plate 30 and the main pipe 12 by hand until the heat from the first and second sides 32, 34 of the plate 30 melts the distal end 22 of the branch pipe 10 and the exterior surface 24 of the main pipe 12 to form a liquid tight seal therebetween.

The plate 30 may also be attached to a handle 46 to aid in removing the plate 30 from between the branch pipe 10 and the main pipe 12. The handle 46 is insulated so that the user can grip the handle 46 with a light glove or a bare hand.

Figure 12:
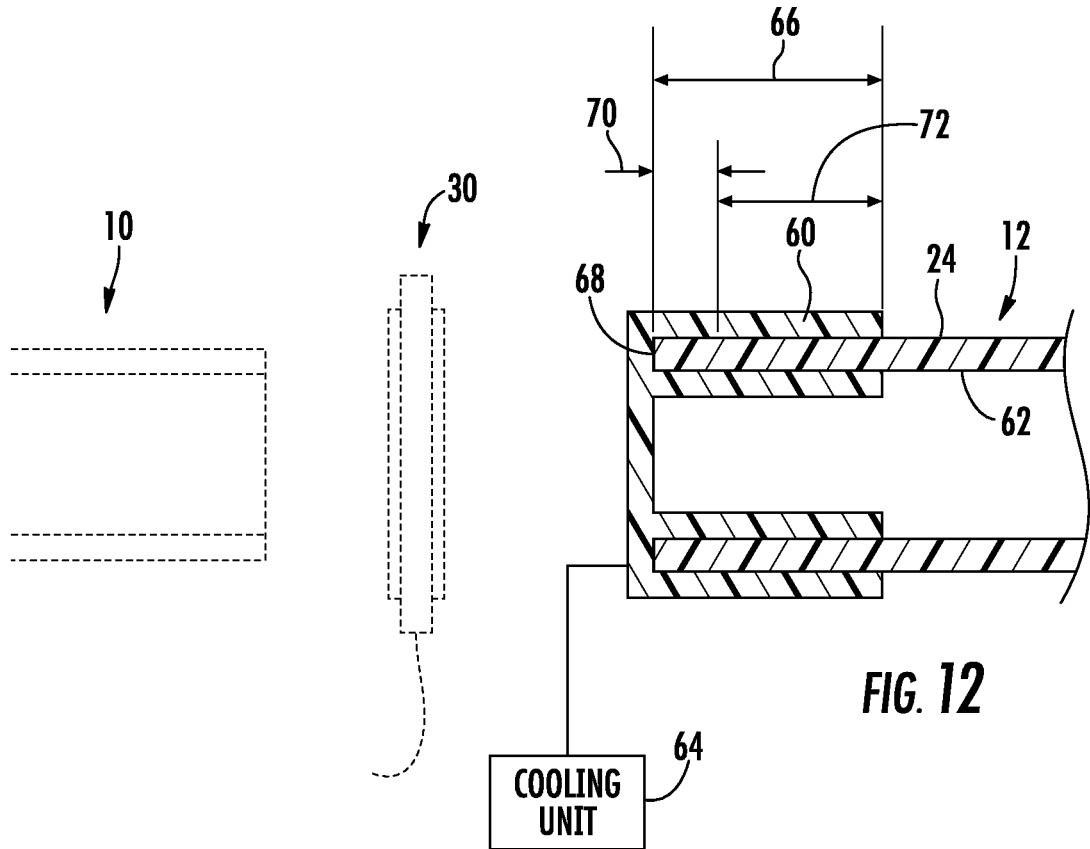
FIG. 12 illustrates a cooling unit for expediting the time for joining first and second pipes.

Referring now to FIG. 12, a second embodiment of a method and apparatus for joining first and second pipes 10, 12 is disclosed. The apparatus may include a sleeve 60 that is sized and configured to wrap around both the internal surface 62 and the exterior surface 24 of the pipe 10, 12. The sleeve 60 may be connected to a cooling unit 64 which actively cools down the sleeve 60. Cold water may flow through the sleeve 60. Alternatively, the sleeve may be a thermoelectric cooler. When the sleeve 60 is placed over the distal end portion 66 of the pipes 10, 12, the sleeve 60 is operative to reduce the temperature of the distal end portion 66. By reducing the temperature of the distal end portion 66 of the pipe 10, 12, heat introduced into the distal end 68 of the pipe 10, 12 can be more quickly removed therefrom to lower the temperature below its softening temperature so that the operator need not wait as long for the heated portions of the pipes 10, 12 to cool to form the joint 20.

When the plate 30 heats up the distal end 68 of the pipes 10, 12 in order to raise its temperature above the softening temperature of the pipes 10, 12, the heat penetrates the distal end 68 of the pipes 10, 12 a distance 70 that is less than the distal end portion 66. As such, a smaller portion 70 is raised to the softening temperature of the material of the pipes 10, 12. During operation, the sleeve 60 cools down the entire distal end portion 66 of the pipes 10, 12. In contrast, the plate 30 raises the temperature of the distal ends 68 of the pipes 10, 12 above the softening temperature of the material of the pipes 10, 12. In other words, the portions 70 of the pipes 10, 12 are raised to the softening temperature.

In other words, the portions 70 of the pipes 10, 12 are raised to the softening temperature while the remaining portion 72 remains at a temperature lower than the softening temperature. After the plate 30 is removed and the distal ends 68 of the pipes 10, 12 are pushed together, the heat from the portions 70 is drawn into the remaining portion 72 to accelerate cool down of the smaller portions 70 of the pipes 10, 12. In order to assist in the process, the various aspects and method steps described in relation to the vacuum 29 and the cap 28 may be used in joining the distal ends 68 of the first and second pipes 10, 12.

The above description is given by way of example, and not limitation. Given the above disclosure, one skilled in the art could devise variations that are within the scope and spirit of the invention disclosed herein, including various ways of forming the cap. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of forming a liquid tight seal between a distal end of a first pipe and a middle portion of an exterior side surface of a second pipe, the first and second pipes fabricated from polyethylene, polyvinyl chloride or polypropylene material which defines a selected material, the method comprising the steps of:

heating the distal end of the first pipe with a heater, the distal end of the first pipe defining an inner peripheral edge and an outer peripheral edge, the heater being applied to the distal end of the first pipe until an entire end surface of the distal end between the inner peripheral edge and the outer peripheral edge of the first pipe has reached a softening temperature of the selected material;

heating the middle portion of the exterior side surface of the second pipe;

after the heating steps, removing the heater from the first pipe;

after the heating steps and the removing step, directly contacting the distal end of the first pipe to the middle portion of the exterior side surface of the second pipe;

creating a first negative pressure within a cavity defined by the first pipe and the middle portion of the exterior side surface of the second pipe after the contacting step so that the distal end of the first pipe is pushed into the middle portion of the exterior side surface of the second pipe and the middle portion of the exterior side surface of the second pipe covers and closes the distal end of the first pipe; and applying even pressure about a circumference of the distal end of the first pipe as the distal end of the first pipe is pushed into the middle portion of the exterior side surface of the second pipe.

2. The method of claim 1 wherein the step of heating the distal end of the first pipe is performed until at least ½ inch of the distal end of the first pipe has reached the softening temperature of the selected material.

3. The method of claim 1 wherein both heating steps are performed with the heater, the heater having a plate, the plate having opposed first and second sides respectively sized and configured to mate with the distal end of the first pipe and the middle portion of the exterior side surface of the second pipe.

4. The method of claim 3 wherein the first side of the plate has a convex configuration and the second side of the plate has a concave configuration.

5. The method of claim 3 further comprising a step of creating a second negative pressure between the plate of the heater and the middle portion of the exterior side surface of the second pipe during the heating steps so that the second negative pressure is sufficient to hold the plate of the heater on the middle portion of the exterior side surface of the second pipe.

6. The method of claim 5 wherein the plate of the heater has a through hole so that the second negative pressure is applied between the plate and the middle portion of the exterior side surface of the second pipe to hold the plate on the second pipe.

7. The method of claim 6 wherein the through hole is a channel.

8. The method of claim 1 further comprising a step of providing a vacuum device for creating the first negative pressure and a cap attachable to the first pipe, the vacuum device being connectable to the cap;
wherein the creating the first negative pressure step includes a step of capping an opposed distal end of the first pipe with the cap, the cap being in fluid communication with the vacuum device for creating the first negative pressure.

9. The method of claim 1 wherein the applying even pressure step includes steps of maintaining the first negative pressure in the cavity, and allowing an angular relationship between the first pipe and the second pipe to change as the first negative pressure is maintained in the cavity and the distal end of the first pipe is pushed into the middle portion of the exterior side surface of the second pipe.

10. The method of claim 1 wherein the step of heating the middle portion of the exterior side surface of the second pipe comprises a step of contacting the middle portion of the exterior side surface of the second pipe to a protrusion of the heater.

11. The method of claim 1 further comprising a step of forming a through hole in the middle portion of the exterior side surface of the second pipe after the applying even pressure step.

12. The method of claim 11 wherein the step of forming a through hole comprises:
inserting a drill bit into an interior cavity of the first pipe; and
drilling the through hole into the middle portion of the exterior side surface of the second pipe with the drill bit so that the first pipe is in fluid communication with the second pipe.

13. The method of claim 1 further comprising the steps of:
providing the first pipe, the first pipe having a first wall thickness which is defined by the inner and outer peripheral edges of the distal end of the first pipe; and
providing the second pipe, the second pipe having a second wall thickness which is defined by the exterior side surface of the second pipe and an interior side surface of the second pipe which is concentric with the exterior side surface of the second pipe.

14. A method of forming a liquid tight seal between a distal end of a first pipe and an exterior side surface of a second pipe, the first and second pipes fabricated from polyethylene, polyvinyl chloride or polypropylene material which defines a selected material, the method comprising the steps of:
heating the distal end of the first pipe with a heater, the distal end of the first pipe defining an inner peripheral edge and an outer peripheral edge, the heater being applied to the distal end of the first pipe until an entire end surface of the distal end between the inner peripheral edge and the outer peripheral edge of the first pipe has reached a softening temperature of the selected material;
heating the exterior side surface of the second pipe;
after the heating steps, removing the heater from the first pipe;
after the heating steps and the removing step, directly contacting the distal end of the first pipe to the exterior side surface of the second pipe;
creating a first negative pressure within a cavity defined by the first pipe and the exterior side surface of the second pipe after the contacting step so that the distal end of the first pipe is pushed into the exterior side surface of the second pipe;
applying even pressure about a circumference of the distal end of the first pipe as the distal end of the first pipe is pushed into the exterior side surface of the second pipe; and
cutting a through hole in the exterior side surface of the second pipe at a location of the first pipe to establish fluid communication between the first and second pipes after the applying even pressure step.

15. The method of claim 14 wherein the step of cutting the through hole comprises the steps of:
inserting a drill bit into the first pipe; and
drilling the through hole into the exterior side surface of the second pipe with the drill bit.

16. The method of claim 14 wherein the step of cutting the through hole comprises the steps of:
inserting a core bit into the first pipe; and
cutting the through hole in the exterior side surface of the second pipe with the core bit.

17. The method of claim 14 wherein the first and second pipes are fabricated from high or low density polyethylene material.

18. The method of claim 14 wherein the heater has a plate, and the method further comprises a step of creating a second negative pressure between the plate of the heater and the exterior side surface of the second pipe during the heating steps so that the second negative pressure is sufficient to hold the plate of the heater on the exterior side surface of the second pipe.

19. A method of forming a liquid tight seal between a distal end of a first pipe and a second pipe, the first and second pipes fabricated from polyethylene, polyvinyl chloride or polypropylene material which defines a selected material, the method comprising the steps of:
heating the distal end of the first pipe with a heater, the distal end of the first pipe defining an inner peripheral edge and an outer peripheral edge, the heater being applied to the distal end of the first pipe until an entire surface of the distal end between the inner peripheral edge and the outer peripheral edge of the first pipe has reached a softening temperature of the selected material;
heating the second pipe;
after the heating steps, removing the heater from the first pipe;
after the heating steps and the removing step, directly contacting the distal end of the first pipe to the second pipe;
creating a first negative pressure within a cavity of the first pipe after the contacting step so that the distal end of the first pipe is pushed into the second pipe; and
applying even pressure about a circumference of the distal end of the first pipe as the distal end of the first pipe is pushed into the second pipe;
wherein both heating steps are performed with the heater, the heater having a plate, the plate having opposed first and second sides respectively sized and configured to mate with the distal end of the first pipe and an exterior side surface of the second pipe;
wherein the first side of the plate has a convex configuration and the second side of the plate has a concave configuration; and wherein the second side of the plate of the heater has an outer peripheral edge larger than the outer peripheral edge of the distal end of the first pipe and an annular protrusion smaller than the inner peripheral edge of the distal end of the first pipe, and the method further comprises the steps of:

forming an annular indentation into the exterior side surface of the second pipe with the annular protrusion of the plate; and creating a second negative pressure within a space defined by the annular protrusion of the plate of the heater, the plate of the heater and the exterior side surface of the second pipe.

20. A method of forming a liquid tight seal between a distal end of a first pipe and a second pipe, the first and second pipes fabricated from polyethylene, polyvinyl chloride or polypropylene material which defines a selected material, the method comprising the steps of:

heating the distal end of the first pipe with a heater, the distal end of the first pipe defining an inner peripheral edge and an outer peripheral edge, the heater being applied to the distal end of the first pipe until an entire surface of the distal end between the inner peripheral edge and the outer peripheral edge of the first pipe has reached a softening temperature of the selected material;

heating the second pipe;

after the heating steps, removing the heater from the first pipe;

after the heating steps and the removing step, directly contacting the distal end of the first pipe to the second pipe;

creating a negative pressure within a cavity of the first pipe after the contacting step so that the distal end of the first pipe is pushed into the second pipe; and applying even pressure about a circumference of the distal end of the first pipe as the distal end of the first pipe is pushed into the second pipe;

wherein the step of heating the second pipe comprises a step of contacting an exterior surface of the second pipe to a protrusion of the heater; and wherein the protrusion has a cup configuration.

* * * * *